(12) United States Patent
Turtinen et al.

(10) Patent No.: US 11,265,756 B2
(45) Date of Patent: Mar. 1, 2022

(54) FLEXIBLE MAPPING OF LOGICAL END-POINTS

(71) Applicant: NOKIA SOLUTIONS AND NETWORKS OY, Espoo (FI)

(72) Inventors: Samuli Heikki Turtinen, Li (FI); Andreas Maeder, Würzburg (DE); Vinh Van Phan, Oulu (FI); Matti Einari Laitila, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 13 days.

(21) Appl. No.: 15/778,727

(22) PCT Filed: Nov. 27, 2015

(86) PCT No.: PCT/EP2015/077863
§ 371 (c)(1),
(2) Date: May 24, 2018

(87) PCT Pub. No.: WO2017/088926
PCT Pub. Date: Jun. 1, 2017

(65) Prior Publication Data
US 2018/0352470 A1    Dec. 6, 2018

(51) Int. Cl.
*H04W 28/02* (2009.01)
*H04L 45/24* (2022.01)
(Continued)

(52) U.S. Cl.
CPC ......... *H04W 28/0268* (2013.01); *H04L 45/24* (2013.01); *H04L 45/306* (2013.01); *H04W 28/0263* (2013.01); *H04W 28/10* (2013.01)

(58) Field of Classification Search
None
See application file for complete search history.

(56) References Cited

U.S. PATENT DOCUMENTS

2007/0036145 A1* 2/2007 Riley ................. H04L 41/0893
370/352
2008/0274729 A1   11/2008 Kim et al.
(Continued)

FOREIGN PATENT DOCUMENTS

KR    10-2008-0098302 A    11/2008
WO    WO 02/093968 A1      11/2002
(Continued)

OTHER PUBLICATIONS

Korean Office Action application No. 10-2018-701004 dated Mar. 11, 2019.
(Continued)

*Primary Examiner* — Brian S Roberts
(74) *Attorney, Agent, or Firm* — Squire Patton Boggs (US) LLP

(57) ABSTRACT

Various communication systems may benefit from differentiated quality of service management. For example, specific applications run on a user equipment in a 5G radio access network may benefit from the flexible differentiated quality of service management. A method includes determining a service flow setup, and mapping traffic through the service flow by a common convergence sublayer entity to at least one radio convergence sublayer entity. The method also includes controlling the traffic through the service flow.

18 Claims, 8 Drawing Sheets

(51) Int. Cl.
*H04L 45/30* (2022.01)
*H04W 28/10* (2009.01)

(56) References Cited

U.S. PATENT DOCUMENTS

| | | | |
|---|---|---|---|
| 2008/0304404 A1* | 12/2008 | Lu | H04L 1/0625 370/210 |
| 2014/0153392 A1* | 6/2014 | Gell | H04W 28/0236 370/230 |
| 2015/0098332 A1* | 4/2015 | Eriksson | H04L 47/14 370/235 |
| 2017/0164218 A1* | 6/2017 | Ni | H04W 48/18 |
| 2018/0227206 A1* | 8/2018 | Bedekar | H04L 43/0847 |
| 2018/0227793 A1* | 8/2018 | Kim | H04L 5/0078 |
| 2018/0249381 A1* | 8/2018 | Chandrashekar | H04W 74/006 |

FOREIGN PATENT DOCUMENTS

| | | |
|---|---|---|
| WO | WO 2013/112084 A1 | 8/2013 |
| WO | WO 2017/042204 A1 | 3/2017 |

OTHER PUBLICATIONS

International Search Report & Written Opinion dated Jul. 28, 2016 corresponding to International Patent Application No. PCT/EP2015/077863.

3GPP TS 36.300 V13.1.0 (Sep. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Sep. 2015.

3GPP TS 36.323 V12.4.0 (Jun. 2015) Technical Specification, 3rd Generation Partnership Project; Technical Specification Group Radio Access Network; Evolved Universal Terrestrial Radio Access (E-UTRA); Packet Data Convergence Protocol (PDCP) specification (Release 12), LTE Advanced, 33 pages.

* cited by examiner

FLEXIBLE MAPPING OF LOGICAL END-POINTS

BACKGROUND

Field

Various communication systems may benefit from differentiated quality of service management. For example, specific applications run on a user equipment in a 5G radio access network may benefit from the flexible differentiated quality of service management on a radio convergence sublayer.

Description of the Related Art

Due to the increased diversity and volume of applications utilized by users in modern communication systems, a massive growth in over-the-top content traffic has occurred. Users rely on a multitude of applications, each providing specific services and generating personalized content. Because of the diverse nature of these applications, it can be beneficial for a network to differentiate between them, and control network traffic flow in view of the diverse nature of each application.

Current Long Term Evolution (LTE) layer 2 (L2) protocol architecture may not provide the requisite flexibility to dynamically setup and control radio bearers having unique quality of service characteristics. FIG. 1 illustrates the current LTE L2 architecture according to 3GPP TS 36.300 v 13.0.0. In LTE L2, a radio link control (RLC) is located between the packet data convergence protocol (PDCP) and medium access control (MAC) sublayers. The RLC sublayer is responsible for transferring upper layer protocol data units (PDUs) generated by radio resource control (RRC) or the PDCP sublayers. In addition, the RLC sublayer can operate in one of three modes of operation: transparent mode (TM), unacknowledged mode (UM), or acknowledged mode (AM).

In the current architecture, radio bearers are statically configured to have one-to-one mapping for evolved packet system (EPS) bearers. In other words, each radio bearer is associated with one PDCP entity, and each PDCP entity is associated with one RLC entity. As such, the current layer 2 protocol may not support dynamic and fine-granular quality of service provisioning by the radio access network (RAN), without having to involve extensive RRC signaling, as well as non-access stratum (NAS) signaling, between a user equipment and the network.

LTE L2 may not adequately differentiate between diverse applications whose quality of experience (QoE) requirements are highly variant. For example, the QoE requirements for video streaming may be different than the QoE requirements for instant messaging.

SUMMARY

According to certain embodiments, a method may include determining a service flow setup, and mapping traffic through the service flow by a common convergence sublayer entity to at least one radio convergence sublayer entity. The method can also include controlling the traffic through the service flow.

According to certain embodiments, an apparatus may include at least one memory including computer program code, and at least one processor. The at least one memory and the computer program code are configured, with the at least one processor, to cause the apparatus at least to determine a service flow setup, and map traffic through the service flow by a common convergence sublayer entity to at least one radio convergence sublayer entity. The at least one memory and the computer program code are configured, with the at least one processor, to also cause the apparatus at least to control the traffic through the service flow.

An apparatus, in certain embodiments, may include means for determining a service flow setup, and means for mapping traffic through the service flow by a common convergence sublayer entity to at least one radio convergence sublayer entity. The apparatus can also include means for controlling the traffic through the service flow.

According to certain embodiments, a non-transitory computer-readable medium encoding instructions that, when executed in hardware, perform a process. The process can include determining a service flow setup, and mapping traffic through the service flow by a common convergence sublayer entity to at least one radio convergence sublayer entity. The process can also include controlling the traffic through the service flow.

A computer program product, in certain embodiments, can encode instructions for performing a process. The process can include determining a service flow setup, and mapping traffic through the service flow by a common convergence sublayer entity to at least one radio convergence sublayer entity. The process can also include controlling the traffic through the service flow.

According to certain embodiments, a method may include identifying a service flow, wherein traffic through the service flow is mapped by a common convergence sublayer entity to at least one radio convergence sublayer entity, and controlling at a user equipment the traffic through service flow.

According to certain embodiments, an apparatus may include at least one memory including computer program code, and at least one processor. The at least one memory and the computer program code are configured, with the at least one processor, to cause the apparatus at least to identify a service flow, wherein traffic through the service flow is mapped by a common convergence sublayer entity to at least one radio convergence sublayer entity, and control at a user equipment the traffic through the service flow.

An apparatus, in certain embodiments, may include means for identifying a service flow, wherein traffic through the service flow is mapped by a common convergence sublayer entity and at least one radio convergence sublayer entity, and means for controlling at a user equipment the traffic through the service flow.

According to certain embodiments, a non-transitory computer-readable medium encoding instructions that, when executed in hardware, perform a process. The process may include identifying a service flow, wherein traffic through the service flow is mapped by a common convergence sublayer entity and at least one radio convergence sublayer entity, and controlling at a user equipment the traffic through the service flow.

A computer program product, in certain embodiments, may encode instructions for performing a process. The process can include identifying a service flow, wherein traffic through the service flow is mapped by a common convergence sublayer entity and at least one radio convergence sublayer entity, and controlling at a user equipment the traffic through the service flow.

BRIEF DESCRIPTION OF THE DRAWINGS

For proper understanding of the invention, reference should be made to the accompanying drawings, wherein.

DETAILED DESCRIPTION

Figure 1:
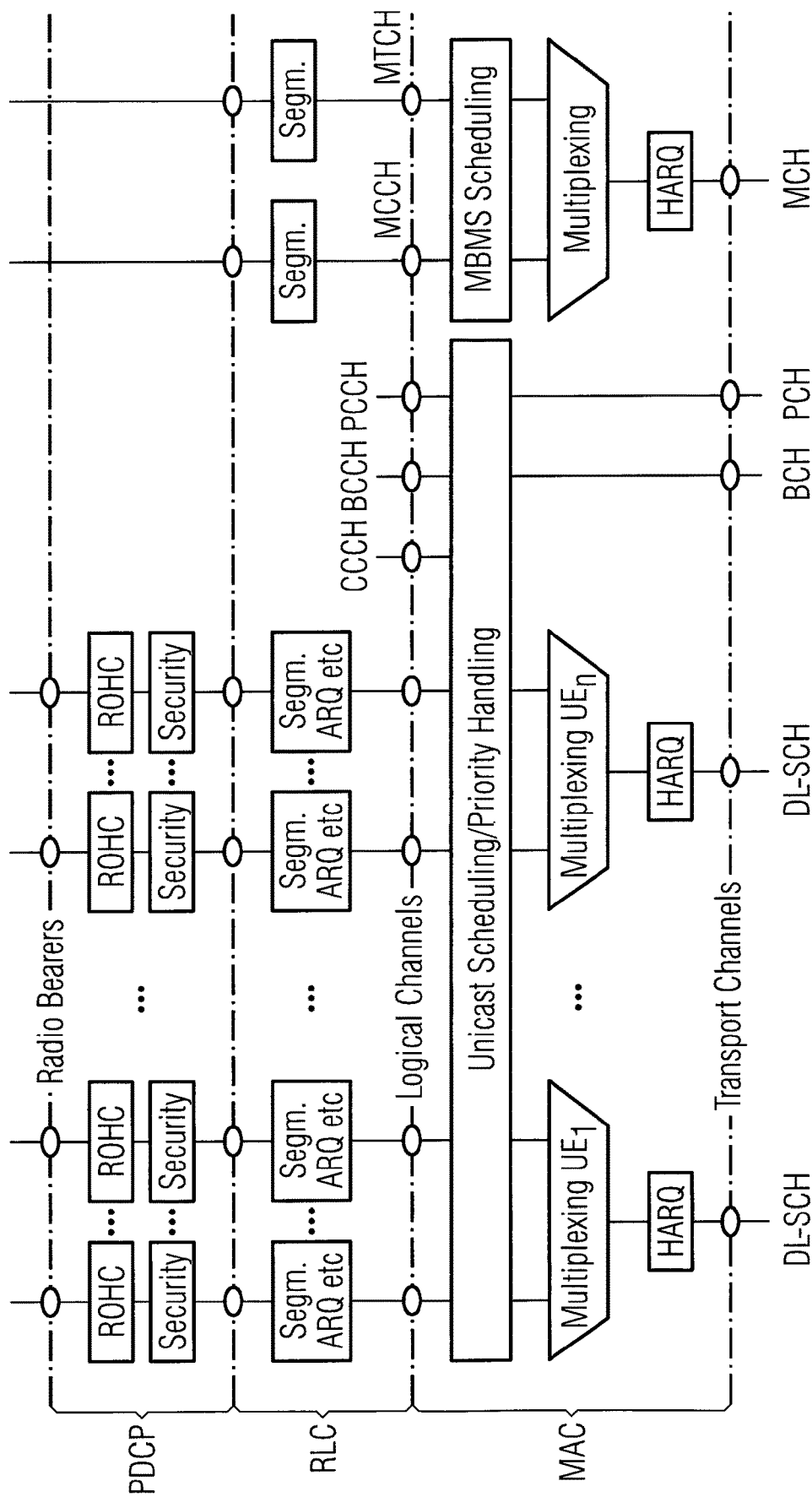
FIG. 1 illustrates the current LTE L2 architecture.

A dynamic network architecture capable of efficiently handling diverse applications with differing QoE and QoS is enabled by certain embodiments. Providing further granularity in QoE and quality of service (QoS) will help to maximize both network efficiency and customer experience.

The next generation of mobile communication systems, 5G, can also benefit from a dynamic network architecture that allows for granular QoE and QoS differentiation to help maximize both network and user equipment efficiency.

Certain embodiments allow for a real-time, dynamic, and adaptive network protocol, in which flexible differentiated QoS management on radio convergence sublayer for a specific service occurs so that specific QoS can be provisioned for specific applications or use cases by the radio access network.

Certain embodiments allow for a flexible steering of traffic, in both the user plane and the control plane, to multiple radio access points with diverse radio interface types and configurations, carrier frequencies, and physical deployment scenarios. Some embodiments allow for a low-complexity mapping of legacy protocol stack structures, for example an LTE stack structure.

The network, in certain embodiments, can determine a service flow setup, and control the service flow associated with one common convergence sublayer entity and at least one radio control sublayer entity. This control in certain embodiments allows for differentiated QoS management on a radio control sublayer layer according to the requirements of the traffic flows carried by the associated service flow on a common convergence sublayer.

In the context of 5G radio access technology, the common convergence sublayer PDCP may be replaced by a Network Convergence Sublayer (NCS), and the radio control sublayer RLC may be replaced by a Radio Convergence Sublayer (RCS). Certain embodiments allow for a dynamic and adaptive network protocol that involves PDCP and NCS, as well as RLC and RCS.

In LTE, bearers may be virtual containers with unique QoS characteristics, over which service data flows (SDFs) are carried. In Evolved Universal Terrestrial Radio Access Network (E-UTRAN) bearers may be known as radio bearers (RBs).

In certain embodiments, the term service flow (SF) may refer to a logical connection in a 5G user plane between an active user equipment (UE) and a serving user plane gateway (uGW). In other embodiments, the SF may refer to a logical connection between an active UE and a packet data network gateway (PDN GW). Such a connection may include a radio access link or connection between the UE and a serving RAN, and a transport network path between the serving RAN and the serving uGW or PDN GW. As such, 5G SF may be broader and more flexible than the evolved packet core (EPC) bearer of LTE, in terms of application-and-service awareness, tunneling, and mapping between EPC bearer and radio bearer. 5G SF also provide more flexibility for the logical service flow resolution inside of the service flow referred to as subservice flows (sSF).

Certain embodiments provide an L2 radio protocol architecture for 5G radio access technology. Specifically, certain embodiments allow for flexible mapping of logical endpoints between a common convergence sublayer, for example NCS and PDCP, to a radio control sublayer, such as RCS or RLC, which can be instantiated for potentially multiple radio interfaces in different physical radio access points.

Figure 2:
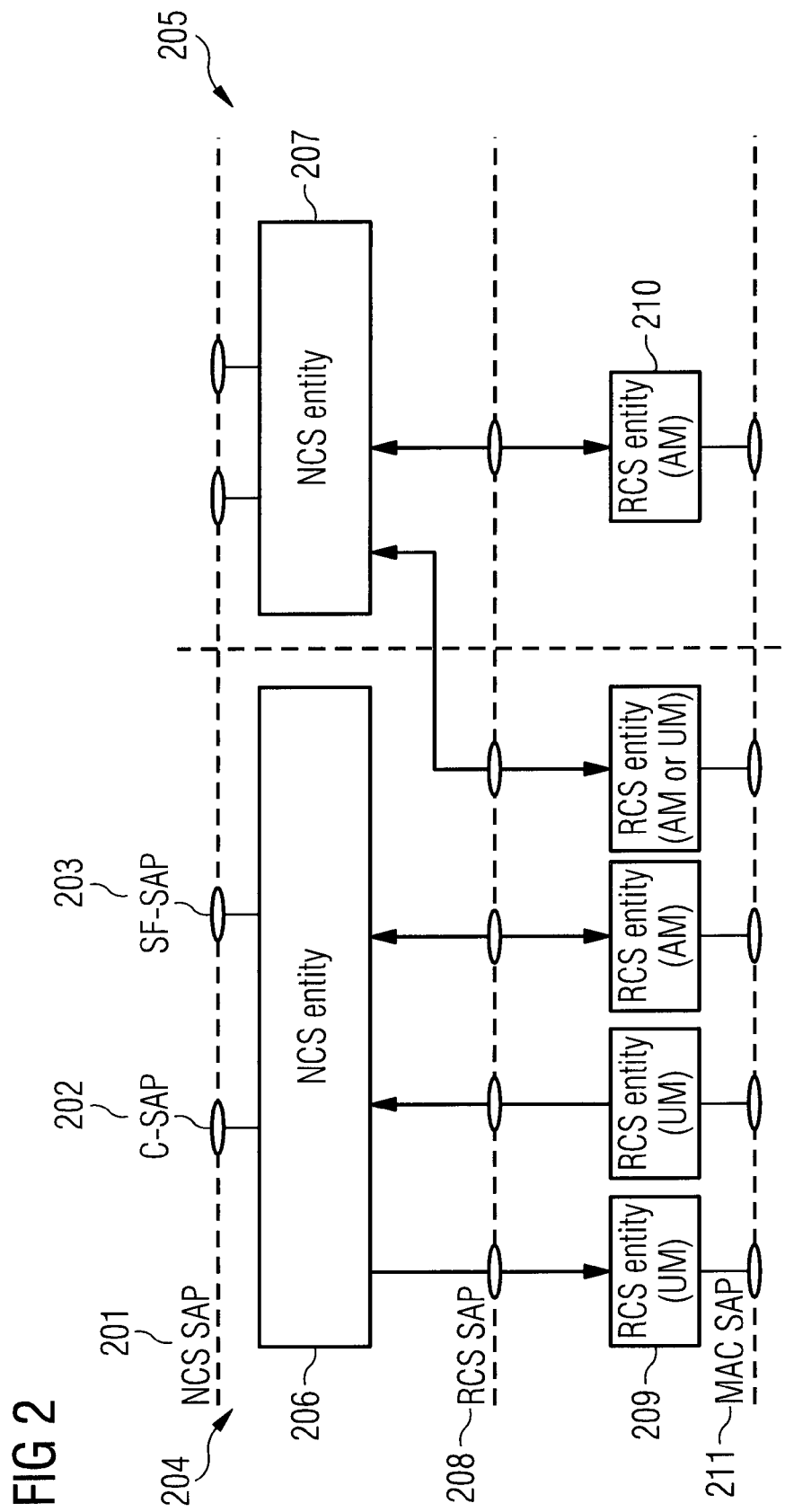
FIG. 2 illustrates an architecture according to certain embodiments.

FIG. 2 illustrates an architecture according to certain embodiments. The NCS service access point layer 201 can include both a control service access point (C-SAP) 202 and a service flow access point (SF-SAP) 203. Each SF can be associated with one NCS entity 206 through SF-SAP 203. Control messages can be accessed through C-SAP 202. C-SAP 202 can be associated with more than one NCS. For example, C-SAP may be an RRC configuration messages or the application awareness function control messages. Each NCS entity may serve only one service flow.

At least one RCS entity 209 can serve each NCS as the lower entity. Although three RCS entities can be associated with the NCS entity in FIG. 2, NCS entity 206 only needs to be associated by one RCS entity 209. An RCS entity, on the other hand, may only serve one NCS entity. As can be seen in FIG. 2, each RCS entity 209 may only be associated with one NCS entity. The RCS entities in FIG. 2 are also shown to be in an unacknowledged or an acknowledged mode.

This association between the NCS entity and the RCS entity, however, is not restricted to entities in the same physical or logical node. For example, FIG. 2 contains a first physical node 204 and a second physical node 205. First physical node 204 includes NCS entity 206 and four RCS entities 209. Only three of the four RCS entities 209 are associated with NCS entity 206, in the embodiment of FIG. 2. The fourth RCS entity can be associated with NCS entity 207, which is located in second physical node 205. NCS entity 207, located in second physical node 205, can be associated with RCS entity 210, which is also located in the second physical node 205, and with an additional RCS entity 209, located in the first physical node 205. As such, the NCS entity can control traffic flows of a SF (sub-service flows) on RCS entities of different radio interfaces.

In some embodiments, the links between NCS and lower layers can be unidirectional. For example, sub-service flows configured for voice traffic can be unidirectional. In other embodiments, the links between the NCS entity and the lower layers can be bidirectional. For example, sub-service flows configured for internet traffic can be bidirectional. Whether a link is unidirectional or bidirectional depends on the characteristics of the traffic flows created by the NCS layer, or provided to the NCS layer by upper control layers. As seen in FIG. 2, some of the SFs and sub-service flows may be are unidirectional, while others are bidirectional.

In the embodiment of FIG. 2, an NCS service access point can be associated with NCS entity 206. NCS entity 206 is associated through RCS SAP 208 with at least one RCS entity 209, which is served by at least one MAC SAP 211.

In certain embodiments, during SF setup, a default configuration can be built in which at least one RCS entity may be a default entity set or configured during setup of the NCS entity. The network has the freedom to configure a default configuration to support any QoS treatment the network may be capable of accommodating. In other words, the default entity can be configured with a certain quality of service treatment. In addition, the parameters of the default configuration may be subject to service being set up. For example, an internet service may require a certain reliability or a video streaming service may require a certain bandwidth or latency. In some embodiments, the UE may request for specific QoS treatment to be configured for the default configuration. The network may then choose to take this request into account when configuring the radio link. Alternately, the network may choose not to take the UE's request for specific QoS treatment into account. In other embodiments, the UE may be able to dictate the QoS treatment, without the network having the ability to make an autonomous decision regarding the QoS treatment.

Both the NCS peer-to-peer entities at the UE, and the serving RAN, in certain embodiments, may be configured so that the NCS control protocol data units (C-PDU) between the UE and the serving RAN can be sent on at least one of the default RCS. In other embodiments, the C-PDUs may be sent on other RCSs, which may be configured to have higher priority than the default one, or on an exclusive RCS which may be configured for sending NCS C-PDUs.

As illustrated in FIG. 2 certain NCS may utilize multi-connectivity (MC) in which more than one radio interface or leg are configured between the UE and network. In some embodiment, at least one additional MC leg can be established in addition to first radio leg/MC leg with at least one RCS entity assigned to each of the at MC legs. In certain embodiments, at least one MC may be established, where the NCS can be associated with a plurality of at least one RCS assigned to a plurality of the at least one MC leg. For example, one or more MC may be established, where the NCS can be associated with two or more RCS assigned to two or more MC legs.

Figure 3:
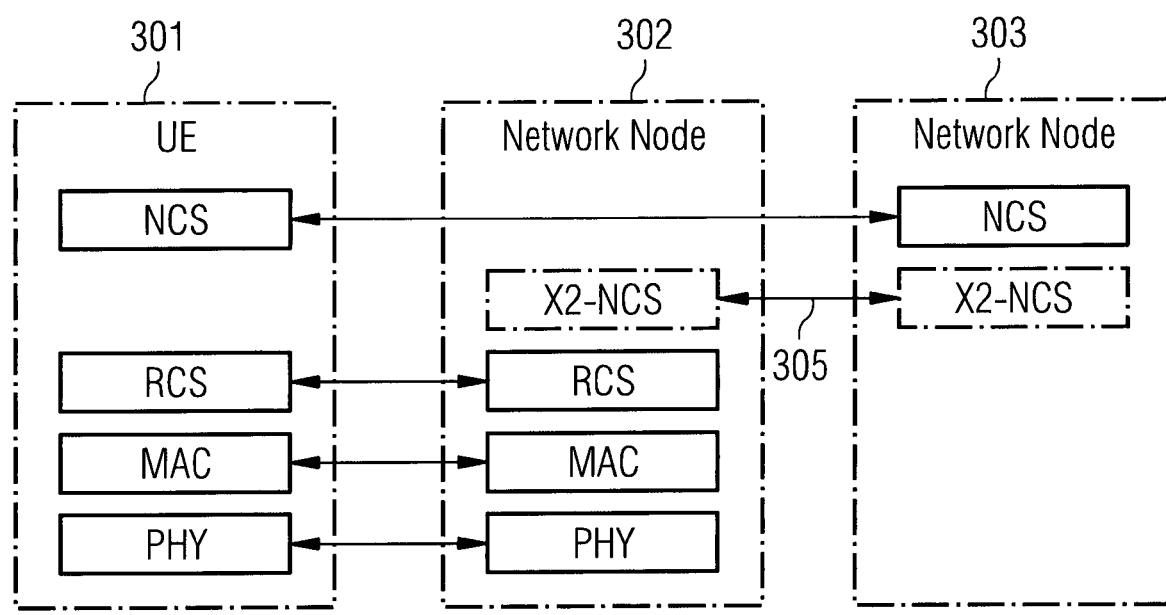
FIG. 3 illustrates a signal flow diagram according to certain embodiments.

FIG. 3 illustrates a signal flow diagram according to certain embodiments. In some embodiments, the user-plane protocol stack shown in FIG. 3 can be compatible with 5G radio access technology. As can be seen in FIG. 3, network node 303 can communicate with access node 302 through the NCS X2 interface 305. X2 interface 305 is the interface between the access nodes involved in MC. In other embodiments, an interface having similar functions to the X2 interface in LTE, may be defined between a plurality of 5G network nodes. In the embodiment of FIG. 3, UE 301 and network node 302 can be connected to one another on the RCS, MAC, and physical layer. In certain embodiments, the NCS can be placed in a different network node than the node to which the UE has RCS, MAC, and physical layer interfaces configured. As shown in FIG. 3, the NCS is placed in network node 303, while the UE has the RCS, MAC, and physical layer interfaces configured in network node 302.

Each configured MC leg of the NCS may have at least one RCS entity. In certain embodiments MC legs may not be visible to the NCS entity, although the NCS entity can see the different RCS entities configured for multi-connectivity. In such embodiments, RRC may be in charge to ensure that the RCS can be configured for each MC leg in which the NCS has a communication link established. In other embodiments, RRC may configure for each MC leg at least one RCS entity that serves the NCS entity as the lower entity.

The transmissions of NCS PDUs between the NCS entity and a positive number N of different corresponding RCS entities, or for instances of a MC leg over the X2 interface, require N individual tunnels. These individual tunnels involve 1:1 mapping on an N number of RCS instances. In other words, N individual tunnels can be needed in a 1:1 mapping scenario.

In other embodiments, only a single 1:N tunnel can be provided with include of possible RCS identification (RCS#ID) based multiplexing for transmitting NCS PDUs over X2 in MC. This embodiment may be similar to 1:1 mapping on corresponding logical channels using logical channel identification (LC#ID) in LTE. In this embodiment, RCS#ID or LC#ID can be sent together with the individual NCS PDU over the X2 tunnel. The radio-access layer needs to provide NCS identification (NCS#ID) and corresponding RCS#ID or LC#ID to a transport-network layer (TNL).

Configured RCS entities may have different characteristics in terms of mode and QoS treatment. In other words, each of the at least one radio control sublayer entity may provide or require a different quality of service treatment. For example, TM/UM/AM mode, configuration parameters, and priorities may be different among RCS entities. Any individual RCS entity associated with the default configuration can be removed from the NCS as long as there can be at least one RCS entity, known as the default RCS, remaining. RRC allocates each NCS an ID during the SF or NCS setup. The ID can then be used to configure each RCS entity of the UE to the correct NCS with which it communicates. The corresponding NCS ID can be included in the RCS configuration message. In one embodiment, the unidirectional links can be configured with RCS unacknowledged mode (UM), while bidirectional links can be configured with acknowledged mode (AM). In other embodiments, bidirectional links may be configured with RCS UM or AM.

In certain embodiments, the NCS can route packets from a certain sSF to multiple RCS entities arbitrarily. In other embodiments, the NCS entity can map packets and sSFs to the at least one RCS entity. For example, a given RCS may temporarily disregard the sSFs currently mapped to the RCS entity, and serve packets submitted by upper layers equally. For instance, NCS can receive inputs from an application awareness function or application scheduler (AS), running above or inside it on a per packet or a per sSF basis. The AS may dictate what kind of radio level QoS treatment is required or provided, and the NCS may take the QoS information into account when deciding to which RCS entity to route the corresponding packet or sSF. In other embodiments, the mapping of packets from the sSFs to the at least one RCS entity may be arbitrary.

In some embodiments, the NCS offers the AS a certain set of radio services and AS decides per sSF to which radio service to map certain packets at a time. The AS may schedule packets between sSFs to each radio service. In some embodiments, the radio service can be a set of configured RCS entities providing the same QoS treatment. For example, in the multi-connectivity case each leg has an RCS entity providing the same QoS. The NCS will receive information from the AS indicating the intended radio service. This information may include quality of service treatment for at least one RCS. The NCS's job can be to route each packet based on how the radio service had been assigned by the AS. If there are multiple legs or RCS entities providing the same radio service, then the NCS can decide to which RCS entity to submit the packets. In certain embodiment a plurality of the at least one radio control sublayer entity may be grouped to provide a radio service.

The NCS may run sequence numbering per created sSF to be able to provide in-order delivery to upper layers on a per sSF basis. Alternatively, the NCS may run sequence numbering for every radio service (which may include multiple sSFs) to allow for an in-order delivery to upper layers on a per radio service basis. In addition, as one RCS entity may need to carry packets belonging to multiple sSF, RCS may need to maintain its own sequence numbering to be able to support, for example, ARQ functionality and in-ordering.

The NCS may be configured to route C-PDUs, which are control PDUs between NCS entities, to a certain RCS entity. In these embodiments, the NCS may route the C-PDUs to a default RCS, or the RCS having the lowest latency, and/or the RCS providing the most reliable packet delivery. Yet in other embodiments, the NCS routes C-PDUs to RCS entity having the highest priority configured for the radio scheduler to serve. In some embodiments, exclusive RCS peer-to-peer entities may be set up at UE and serving RAN to carry NCS C-PDUs.

In certain embodiments, the radio scheduler and/or MAC has no visibility to sSF, but sees RCS entities or buffers. In those embodiments, service level prioritization, such as SF, can be undergone at the radio scheduler, as the RCS entities can be configured for each NCS entity. In some embodiments, the service level prioritization can be done at the application awareness function either inside the UE or the network itself. The link between a transmitting RCS to a receiving RCS may have a logical one-to-one mapping between entities, also known as peer-to-peer entities. The link can form a single end-to-end pipe for NCS to route traffic through, such as a radio bearer.

There may be NCS-RCS inter-layer interactions at the serving RAN side for optimizing purposes. In other embodiments, NCS-RCS inter-layer interactions occur in both the serving RAN and the UE side for optimization purposes. Due to the flexible functional split of 5G RAN, which includes different cloud RAN options, the NCS and the RCS may be located in different locations or places. In one instance, for example, an NCS may be configured to route C-PDUs among different associated RCS as discussed above for NCS C-PDUs. Those same C-PDUs may also be utilized for routing and transmitting RCS control information. In other words, RCS may request NCS to route some RCS control information in the form of NCS C-PDU. In this embodiment, the upper level may provide services for the lower layer, as opposed to the current protocol design in LTE, where the lower layer is supposed to provide services for the upper layer.

In other embodiments, NCS may initiate a reset of a RCS, as well as flushing, discarding or advancing RCS buffer, for at least one RCS entity based on various factors. One such factor can include the progress of at least one other RCS. This embodiment can be particularly helpful in a MC case configured to use duplication or replication of same data in different MC legs for ensuring both high reliability and low latency.

Figure 4:
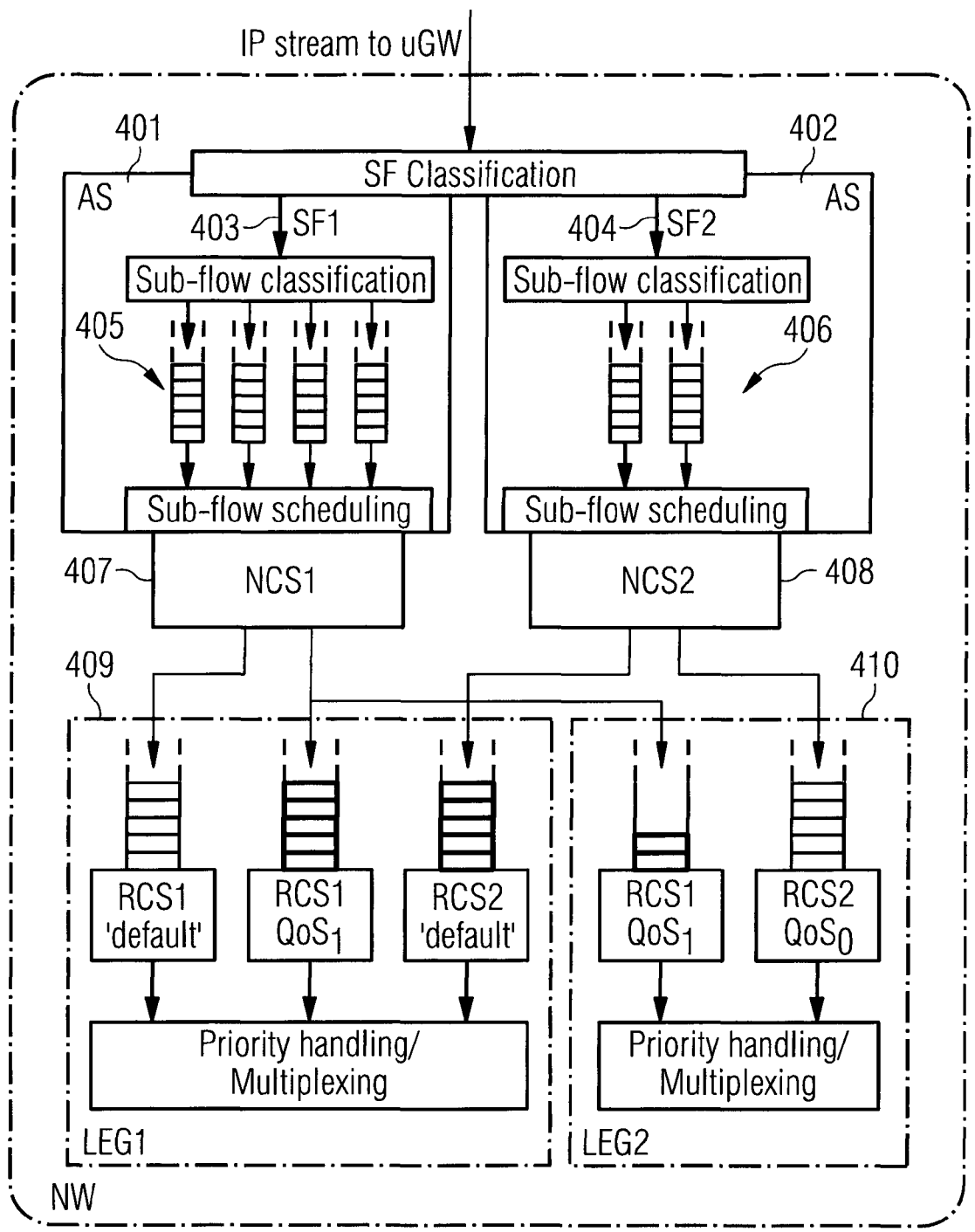
FIG. 4 illustrates a signal flow diagram according to certain embodiments.

FIG. 4 illustrates a signal flow diagram according to certain embodiments. The embodiment of FIG. 4 illustrates NCS to RCS mapping from the network perspective for one UE associated with two multi-connectivity legs and two configured SFs. AS may schedule each sSF by its implementation defining means to any NCS provided radio service. The network may determine an SF setup, and traffic through the SF is then mapped by an NCS entity to at least one RCS entity. The traffic though the SF is then controlled. NCS maintains the flow control between RCS entities, and decides the final mapping of the packet or sSF to certain RCS entity.

For the first service flow (SF1) 403 a first AS 401 has allocated four different sub-flows 405 to provide different QoE or QoS treatment. The first NCS (NCS1) 407 provides higher layer support for two first RCS entities (RCS1) in a first leg (leg 1) 409, and another RCS1 entity in a second leg (leg 2) 410. The first RCS1 in leg 1 can be the default RCS, while the second RCS1 in leg 1 requires or provides a first QoS ($QoS_1$). The third RCS1 located in leg 2 410 also requires or provides $QoS_1$.

For the second service flow (SF2) 404, a second AS 402 has allocated two different sub-flows 406 to provide different QoE or QoS treatment. The second NCS (NCS2) 408 provides higher layer support for a second RCS (RCS2) in leg 1 409, and another second RCS2 in leg 2 410. The first RCS2 located in leg 1 409 can be the default RCS, while the other RCS2 located in leg 2 requires or provides its own QoS ($QoS_0$), different from $QoS_1$. The network can then use the QoS requirements or provisions of the RCS entities in the two legs during priority handling and multiplexing.

Figure 5:
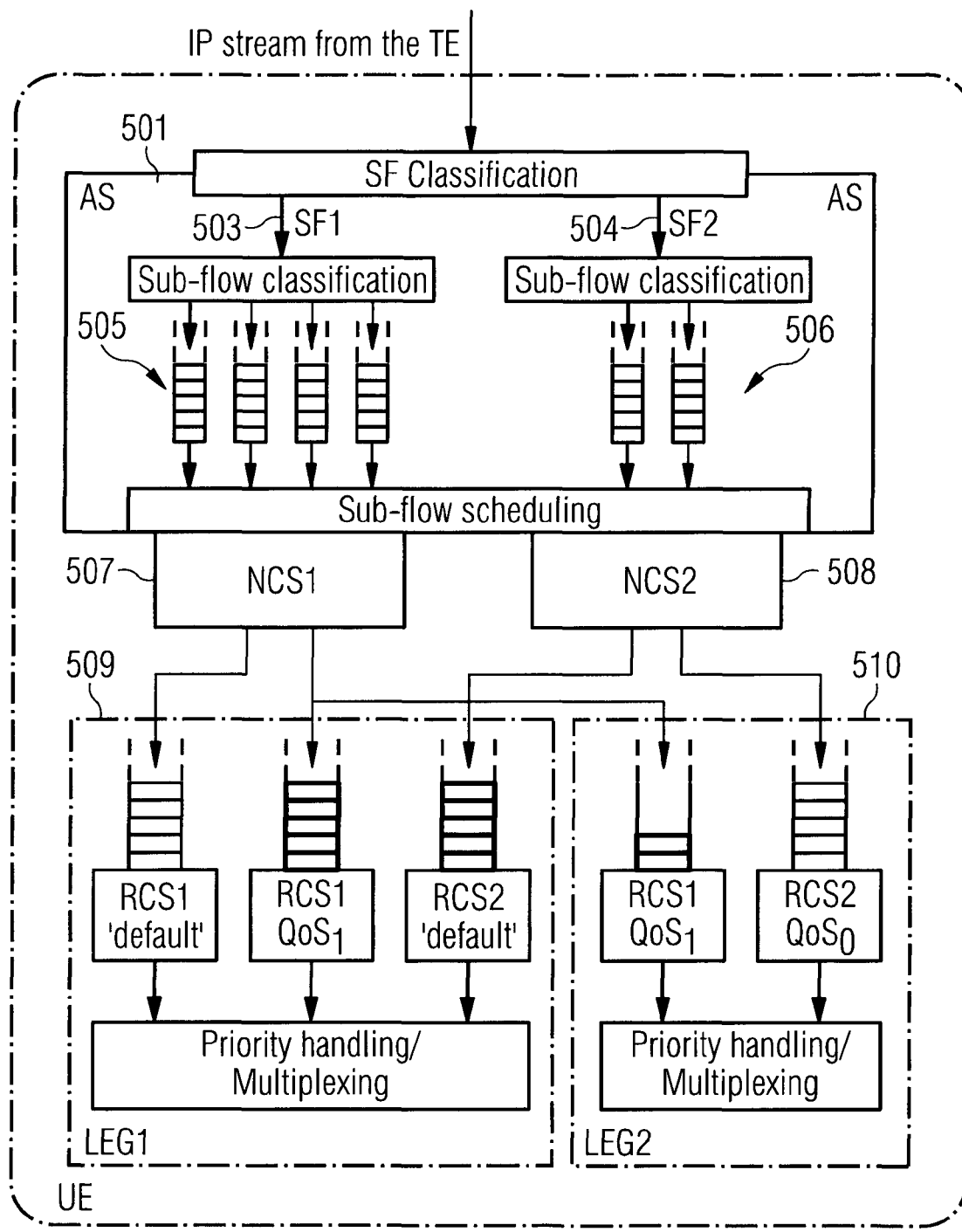
FIG. 5 illustrates a signal flow diagram according to certain embodiments.

FIG. 5 illustrates a signal flow diagram according to certain embodiments. The embodiment of FIG. 5 illustrates NCS to RCS mapping from the UE perspective for one UE associated with two multi-connectivity legs and two configured SFs. The UE may identify a SF, wherein traffic through the service flow is mapped by a NCS to at least one RCS entity, and then control the traffic through the SF. In addition, AS may schedule each sSF by its implementation defining means to any NCS provided radio service. NCS maintains the flow control between RCS entities, and decides the final mapping of the packet or sSF to certain RCS entity.

For SF1 503, a AS 501 has allocated four different sub-flows 505 to provide different QoE or QoS treatment. The NCS1 507 provides higher layer support for two RCS1 in leg 1 509, and another RCS1 entity in leg 2 510. The first RCS1 in leg 1 can be the default RCS, while the second RCS1 in leg 1 requires or provides $QoS_1$. The third RCS1, located in leg 2 510 also requires or provides $QoS_1$.

For the SF2 504, AS 501, which can be the same AS used for SF1, has allocated two different sub-flows 506 to provide different QoE or QoS treatment. The NCS2 508 provides higher layer support for RCS2 in leg 1 509, and another second RCS2 in a leg 2 510. The first RCS2 located in leg 1 509 can be the default RCS, while the other RCS2 located in leg 2 requires or provides $QoS_0$. The network can then use the QoS requirements or provisions of the RCS entities in the two legs during priority handling and multiplexing.

The AS function in the network side can be drawn separately for each SF or NCS entity. On the UE side, however, the AS can be an entity spreading over all of the at least one SF or NCS. In the network, in some embodiments the NCS functions may not be physically co-located, which may require multiple AS functions to be deployed in each site deploying NCS. Otherwise, the pocket routing may not be optimal. On the network side, this may require the radio scheduler to be aware of the SFs with which each RCS entity is associated. Once aware, the network can conduct service aware scheduling and prioritization in between.

On the UE side, the service level prioritization may be done either in the AS function or in the radio scheduler. By doing so, the UE radio or MAC scheduler becomes simpler because it can choose not to care about prioritization between RCS entities having similar QoS treatment requirements.

Figure 6:
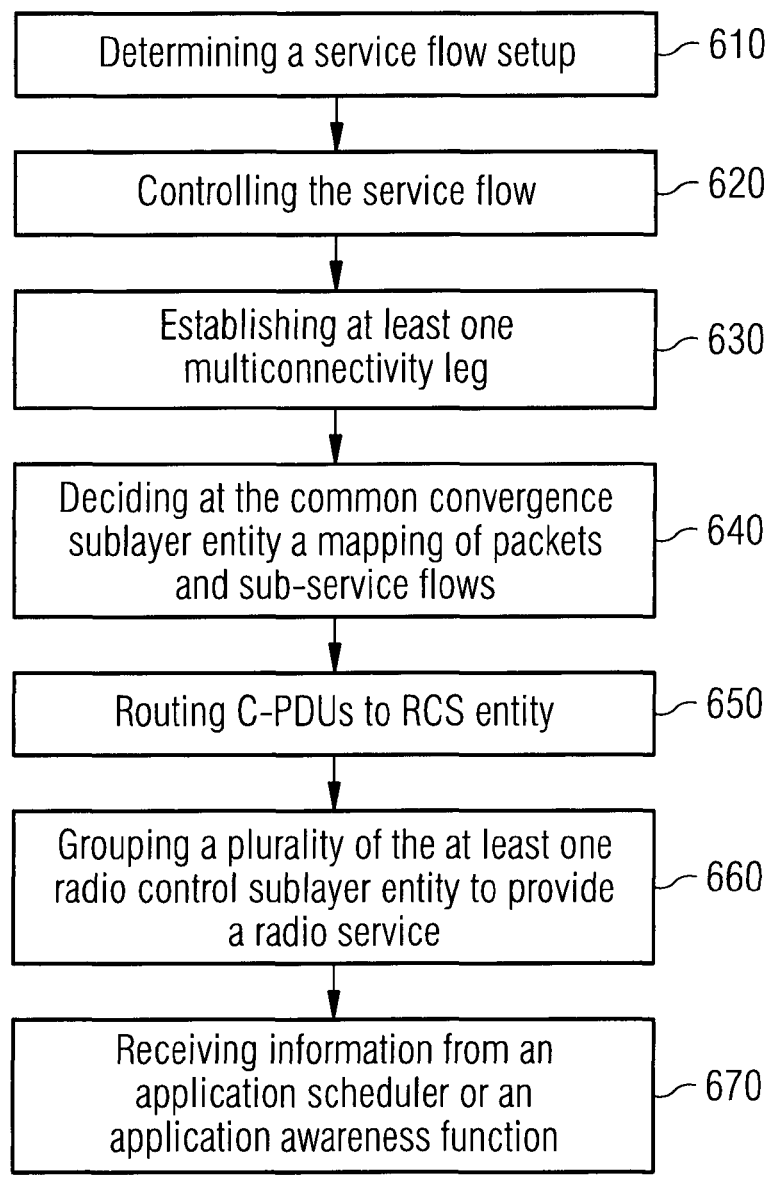
FIG. 6 illustrates a signal flow diagram according to certain embodiments.

FIG. 6 illustrates a signal flow diagram according to certain embodiments. While FIG. 6 illustrates a method having steps in a certain order, the shown order of steps is merely one embodiment of the illustrated method. In step 610, the network may determine a service flow setup. This service flow can be associated with one NCS and at least one RCS, and may be controlled by the network in step 620. The network, in step 630, may also establish at least one multi-connectivity leg with the at least one RCS entity assigned to each multi-connectivity legs. In establishing a multi-connectivity leg, an X2 interface can be used for two network nodes to interact with one another. In other embodiments, an interface having similar functions to the X2 interface in LTE, may be defined between 5G network nodes.

In step 640, the network may decide at the one NCS entity a mapping of packets and sSF to the at least one RCS. The network can then route C-PDUs to the at least one RCS, as shown in step 650. In addition, the network may group a plurality of the at least one RCS, in step 660, to provide a radio service. The network may then receive information, in step 670, from an application scheduler or an application awareness function about the QoS treatment for at least one RCS entity.

Figure 7:
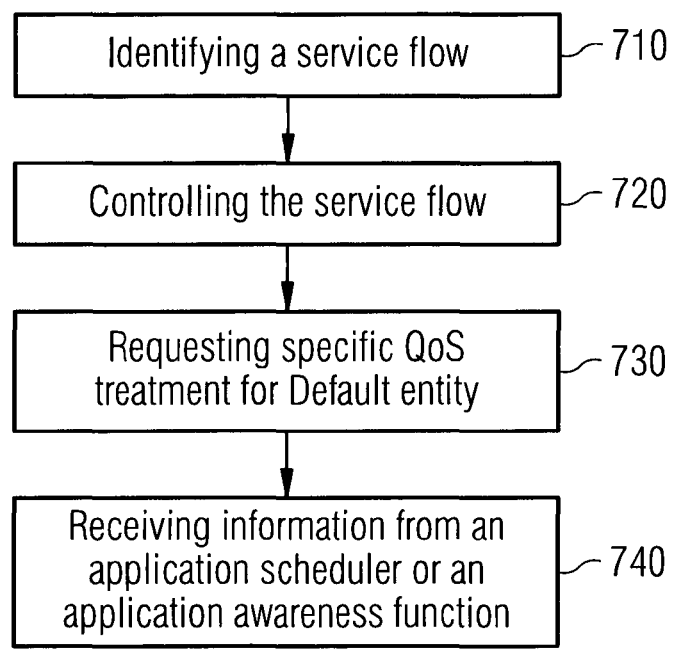
FIG. 7 illustrates a signal flow diagram according to certain embodiments.

FIG. 7 illustrates a signal flow diagram according to certain embodiments. While FIG. 7 illustrates a method having steps in a certain order, the shown order of steps is merely one embodiment of the illustrated method. In step 710, a UE or user device may identify a service flow associated with one NCS and at least one RCS entity. The UE or user device may control the service flow to the at least one radio control sublayer entity, in step 720. If a default RCS entity is assigned during setup, the UE or user device, in step 730, may then request specific QoS treatment to be configured for the default entity. The UE or user device can also receive from the AS or application awareness function information about the QoS treatment for at least one RCS entity.

Figure 8:
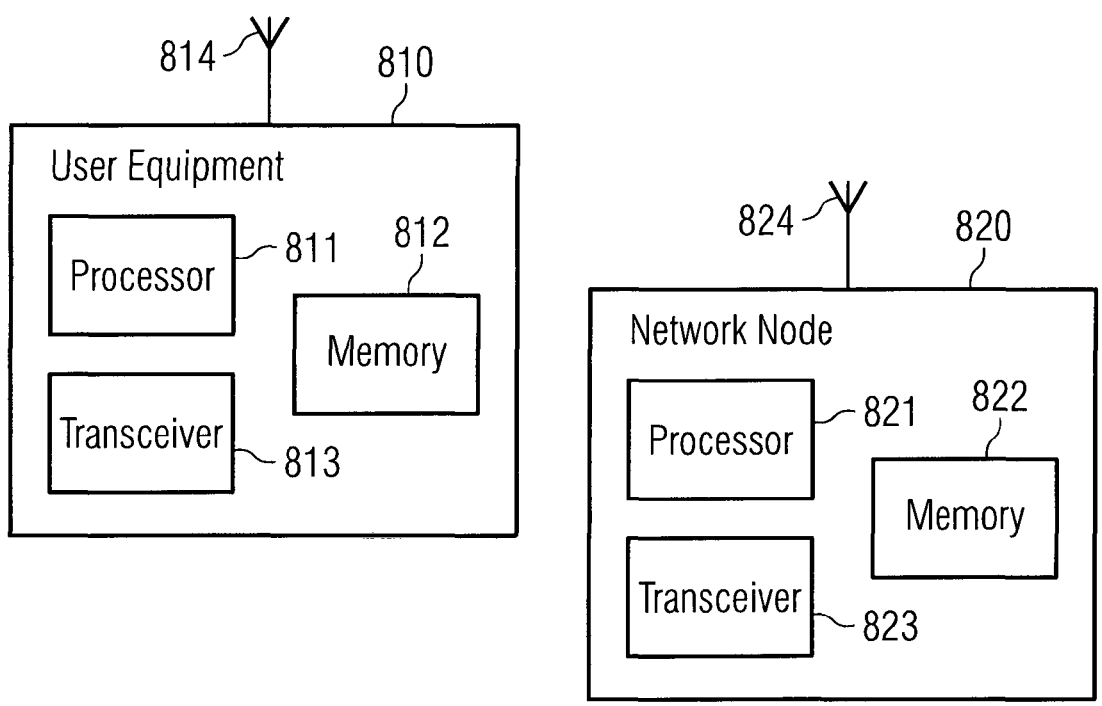
FIG. 8 illustrates a system according to certain embodiments.

FIG. 8 illustrates a system according to certain embodiments. It should be understood that each block of the flowchart of FIGS. 6 and 7, and any combination thereof, may be implemented by various means or their combinations, such as hardware, software, firmware, one or more processors and/or circuitry. In one embodiment, a system may include several devices, such as, for example, network node 820 and UE or user device 810. The system may include more than one UE 810 and more than one network node 820, although only one of each is shown for the purposes of illustration. A network node can be an access point, a base station, an eNB, server, host or any of the other network nodes discussed herein.

Each of these devices may include at least one processor or control unit or module, respectively indicated as 821 and 811. At least one memory may be provided in each device, and indicated as 822 and 812, respectively. The memory may include computer program instructions or computer code contained therein. One or more transceiver 823 and 813 may be provided, and each device may also include an antenna, respectively illustrated as 824 and 814. Although only one antenna each is shown, many antennas and multiple antenna elements may be provided to each of the devices. Other configurations of these devices, for example, may be provided. For example, network node 820 and UE 810 may be additionally configured for wired communication, in addition to wireless communication, and in such a case antennas 824 and 814 may illustrate any form of communication hardware, without being limited to merely an antenna.

Transceivers 823 and 813 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 810 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as a node or user device, may include means for carrying out embodiments described above in relation to FIGS. 2, 3, 4, 5, 6, and 7. In certain embodiments, at least one memory including computer program code can be configured to, with the at least one processor, cause the apparatus at least to perform any of the processes described herein.

According to certain embodiments, an apparatus may include at least one memory including computer program code, and at least one processor. The at least one memory and the computer program code are configured, with the at least one processor, to cause the apparatus at least to determine a service flow setup, and map traffic through the service flow by a common convergence sublayer entity to at least one radio convergence sublayer entity. The at least one memory and the computer program code are also configured, with the at least one processor, to cause the apparatus at least to control the traffic through the service flow. According to certain embodiments, an apparatus may include means for determining a service flow setup, and means for mapping traffic through the service flow by a common convergence sublayer entity to at least one radio convergence sublayer entity. The apparatus also includes means for controlling the traffic through the service flow.

According to certain embodiments, an apparatus may include at least one memory including computer program code, and at least one processor. The at least one memory and the computer program code are configured, with the at least one processor, to cause the apparatus at least to identify a service flow, wherein traffic through the service flow is mapped by a common convergence sublayer entity to at least one radio convergence sublayer entity, and control at a user equipment the traffic through the service flow.

According to certain embodiments, an apparatus may include means for identifying a service flow, wherein traffic through the service flow is mapped by a common convergence sublayer entity and at least one radio convergence sublayer entity, and means for controlling at a user equipment the traffic through the service flow.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 820 and/or UE 810, to perform any of the processes described above (see, for example, FIGS. 3, 4, 5, 6, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 8 illustrates a system including a network node 820 and a UE 810, certain embodiments may be applicable to other configurations, and configurations involving additional elements, as illustrated and discussed herein. For example, multiple user equipment devices and multiple network nodes may be present, or other nodes providing similar functionality, such as nodes that combine the functionality of a user equipment and an access point, such as a relay node. The UE 810 may likewise be provided with a variety of configurations for communication other than communication network node 820. For example, the UE 810 may be configured for device-to-device communication.

The embodiments described above help improve a communication system. The embodiments allow for a proprietary knowledge sharing protocol between a UE and a network node, such as an eNB, that can rid the communication system of a large amount of abandoned downlink data transmissions. Some of the benefits produced by this joint decision making include decreasing the amount of resources a network has to dedicate to downlink transmissions, extending the battery of life of a UE, and improving quality of experience.

The above described protocol allowed for a flexible RAN architecture design supporting arbitrary number of sSFs established by AS or NCS. The design also allows for simple radio implementation for RCS layers and below as sSFs (and potentially SFs) may be invisible to radio layers.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

AS Application Scheduler/Application Awareness Function
C-PDU Control Protocol Data Unit
MAC Media Access Control
MC Multi-connectivity
NCS Network Convergence Sublayer
NW Network
PDCP Packet Data Convergence Protocol
QoE Quality of Experience
QoS Quality of Service
RAN Radio Access Network
RCS Radio Convergence Sublayer
RRC Radio Resource Control
SAP Service Access Point
SF Service Flow
sSF Sub-Flow

We claim:

1. A base station, comprising:
at least one processor;
a common convergence sublayer entity;
a plurality of radio control sublayer entities; and
at least one memory including computer program code,
the at least one memory and the computer program code are configured to, with the at least one processor, cause the base station at least to perform:
determining, by the common convergence sublayer entity, at least one service flow;
mapping, by the common convergence sublayer entity, traffic through one of the at least one service flow to at least one radio control sublayer entity among the plurality of radio control sublayer entities, wherein each of the at least one radio control sublayer entity is associated with a respective radio bearer of the base station; and
controlling, by the common convergence sublayer entity, the traffic through the one of the at least one service flow.

2. The base station according to claim 1, wherein each of the at least one radio control sublayer entity provides a different quality of service treatment.

3. The base station according to claim 1, wherein the at least one memory and the computer program code are further configured to, with the at least one processor, cause the base station to further perform:
deciding, by the common convergence sublayer entity, a mapping of packets and sub-service flows to the at least one radio control sublayer entity.

4. The base station according to claim 1, wherein the mapping of packets and the sub-service flows to the at least one radio control sublayer entity is arbitrary.

5. The base station according to claim 1, wherein one of the at least one radio control sublayer entity is a default sublayer entity set during the determining of the at least one service flow.

6. The base station according to claim 1, wherein the at least one memory and the computer program code are configured to, with the at least one processor, cause the base station to further perform at least one of:
grouping a plurality of the at least one radio control sublayer entity to provide a radio service; or
receiving information from an application scheduler or an application function indicating an intended radio service.

7. The base station according to claim 1, wherein the at least one memory and the computer program code are configured to, with the at least one processor, cause the base station to further perform:
receiving information about a quality of service treatment for the at least one radio control sublayer entity from an application scheduler or an application function.

8. The base station according to claim 7, wherein the application scheduler or the application function is run on a packet basis or a sub-service flow basis.

9. The base station method according to claim 1, wherein the at least one memory and the computer program code are configured to, with the at least one processor, cause the base station to further perform:
routing control protocol data units to at least one of a default radio control sublayer entity, the default radio control sublayer entity having the lowest latency, or the default radio control sublayer entity having the most reliable packet delivery.

10. The base station according to claim 1, wherein the at least one memory and the computer program code are configured to, with the at least one processor, cause the base station to further perform:
establishing at least one multi-connectivity leg, wherein the common convergence sublayer entity is associated with a plurality of the at least one radio control sublayer entity assigned to a plurality of at least one multi-connectivity leg.

11. A user equipment, comprising:
at least one processor;
a common convergence sublayer entity;
a plurality of radio control sublayer entities; and
at least one memory including computer program code, the at least one memory and the computer program code are configured to, with the at least one processor, cause the user equipment at least to perform:
identifying, by the common convergence sublayer entity, at least one service flow;
mapping, by the common convergence sublayer entity, traffic through one of the at least one service flow to at least one radio control sublayer entity among the plurality of radio control sublayer entities, wherein each of the at least one radio control sublayer entity is associated with a respective radio bearer of the user equipment; and
controlling, by the common convergence sublayer entity, the traffic through the one of the at least one service flow.

12. The user equipment according to claim 11, wherein each of the at least one radio control sublayer entity provides a different quality of service treatment.

13. The user equipment according to claim 11, wherein one of the at least one radio control sublayer entity is a default sublayer entity set when the at least one service flow has been determined.

14. The user equipment according to claim 13, wherein the at least one memory and the computer program code are configured to, with the at least one processor, cause the user equipment to further perform:
requesting specific quality of service treatment to be configured for the default sublayer entity.

15. The user equipment according to claim 11, wherein the at least one memory and the computer program code are configured to, with the at least one processor, cause the user equipment to further perform:
receiving information about the quality of service treatment for the at least one radio control sublayer entity from an application scheduler or an application function.

16. The user equipment according to claim 15, wherein the application scheduler or the application function is run on a packet basis or a sub-service flow basis.

17. A method, comprising:
identifying, by a common convergence sublayer entity of a user equipment, at least one service flow;
mapping, by the common convergence sublayer entity, traffic through one of the at least one service flow to at least one radio control sublayer among a plurality of radio control sublayer entities, wherein each of the at least one radio control sublayer entity is associated with a respective radio bearer of the user equipment; and
controlling, by the common convergence sublayer entity, the traffic through the one of the at least one service flow.

18. A computer program product embodied on a non-transitory computer-readable medium encoding instructions that, when executed in hardware, perform a process according to claim 17.

* * * * *